United States Patent Office 2,911,234
Patented Nov. 3, 1959

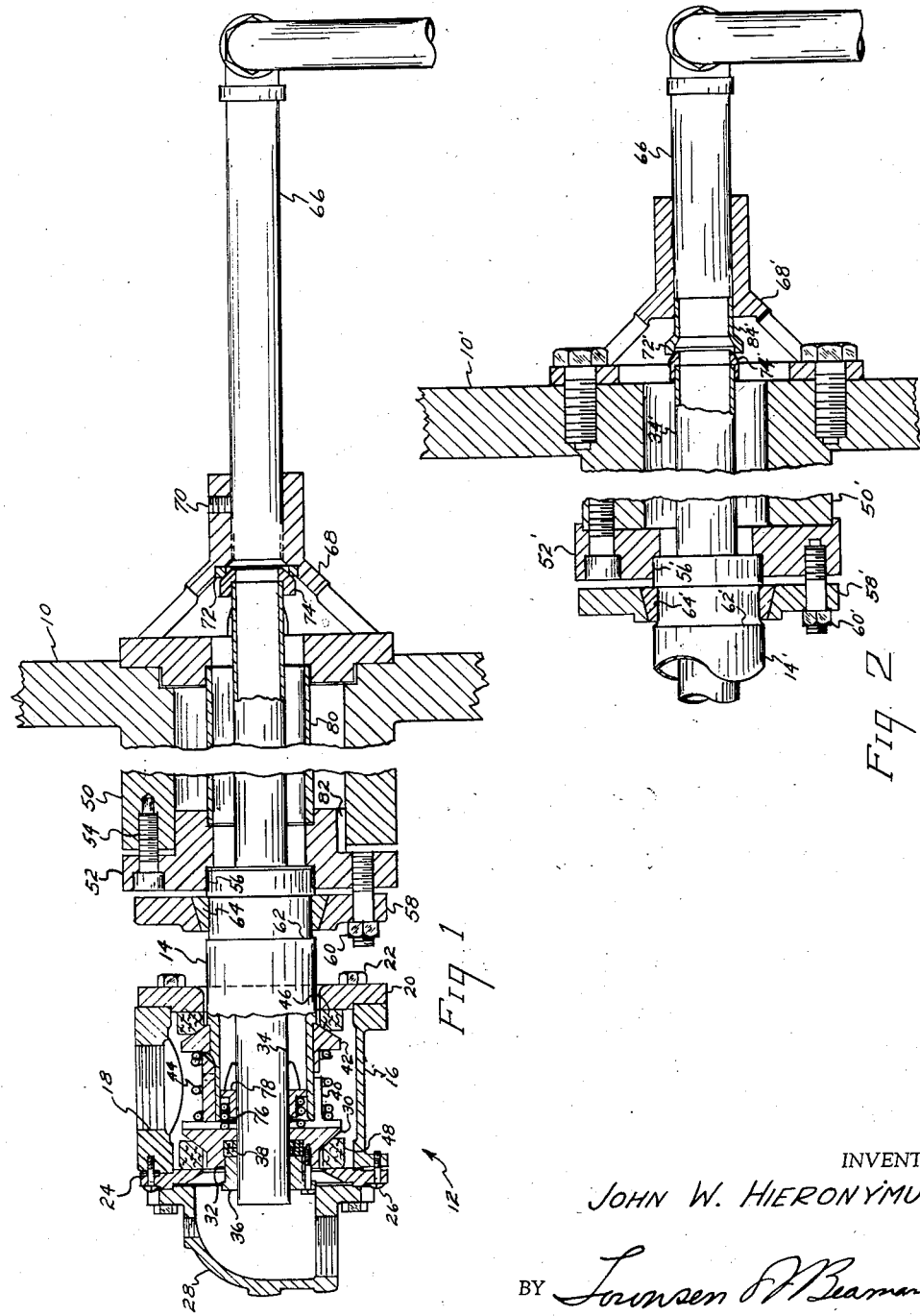

2,911,234

ROTARY JOINT SYPHON PIPE ASSEMBLY

John W. Hieronymus, Three Rivers, Mich., assignor to The Johnson Corporation, Three Rivers, Mich., a corporation of Michigan Application November 27, 1956, Serial No. 624,531

2 Claims. (Cl. 285—53)

The invention relates to steam joints and more particularly to steam joints of the rotatable type wherein steam or other vapor may be introduced into a rotating member.

Several problems arise in rotatable steam joints now in use which have not heretofore been successfully overcome and it is the purpose of the invention to design a steam joint which will be superior to those now on the market overcoming defects in prior steam joint design. One of the primary faults of rotatable steam joints now available arises from the fact that when the steam is piped into the rotatable member, such as a rotating dryer head as found in paper manufacturing, the steam is usually in direct contact with the journal of the rotating member thereby raising the temperature of the journal and shortening bearing life substantially. Another problem which often arises results from misalignment of the syphon pipe in relation to the rotary joint causing faster than normal wear between the sealing members resulting in leaks and high maintenance costs.

It is, thus, an object of the invention to design a rotary steam joint which is capable of long wear without leaking and utilizes an insulating member between the steam inlet and the journal of the rotating member.

Another object of the invention is to produce a rotary steam joint which is self-aligning yet may be easily disassembled for maintenance purposes.

These and other objects of the invention will become apparent when viewed with respect to the accompanying specification and drawings wherein:

Fig. 1 is a cross-section elevational view of the invention, and

Fig. 2 is a cross-section elevation of a modification of the invention as used with existing journals and spiders.

As shown in Fig. 1, the rotary steam joint may be used to introduce steam into a rotating dryer head 10. The joint 12 is mounted upon the tubular main conduit 14 and is designed for relative rotative motion thereto. Joint 12 consists of a housing 16 into which the steam conduit may be threaded at 18. The inner cover 20 is attached to housing 16 by bolts 22 while the outer cover 24 may be affixed by screws 26. An elbow outlet flange 28 is connected to cover 24 and is provided with a threaded outlet whereby the condensation may be carried away, as will be later described.

The end of main 14 supports a sealing seat 30 which is provided with an axial bore and recess 32 into which the syphon pipe extension 34 protrudes. In order to insure a leak-proof joint the extension 34 is surrounded by a bushing 36 which compresses stuffing 38 to prevent the steam from mixing with the condensate. Seat 30 slidingly engages the main 14 and is constructed with slotted ears 40 such that steam introduced at 18 may flow around the end of main 14 into the interior thereof. A second sealing seat 42 is press fitted to main 14 and a compression spring 44 bearing on seats 30 and 42 will tend to slide seat 30 to the left as seen in Fig. 1.

The sealing function takes place at the surfaces of sealing rings 46 and 48 which are interposed between the stationary and rotating elements of the joint 12. Ring 46 is fitted between seat 42 and inner cover 20 while ring 48 is placed between seat 30 and outer cover 24, all of the contacting surfaces of seats, seals and covers must be polished to present smooth surfaces and the wearing surfaces of seals 46 and 48 are preferably chrome plated to provide maximum life. The spring 44 will keep the sealing surfaces engaged at all times and the conical wearing surfaces of rings 46 and 48 will automatically maintain the concentricity between the rings and axis of rotation. It will, thus, be apparent that the main 14 and associated joint elements may rotate while housing 16 will remain stationary, yet steam may be injected into main 14 without leakage.

The dryer head 10 rotates on journal 50, which is supported in suitable bearings (not shown). A flange 52 is bolted to journal 50 by bolts 54 and is provided with a recess 56 into which the end of main 14 is seated. Main 14 is held in position by a quick-release flange 58 which is in turn connected to flange 52 by studs 60 and coacting nut. A groove 62 is cut into main 14 into which the tapered split collar 64 fits. Collar 64 is gripped by flange 58. Thus, as studs 60 are tightened the main 14 will be firmly held in the recess 56 yet by merely unloosening studs 60 the entire joint 12 may be removed from the journal 50 for easy servicing.

The syphon pipe 66 extends into the interior of the dryer head 10 and is provided with a downward extension, the end of which is adapted to pick up the condensed liquid as the head 10 rotates. Pipe 66 is supported by a spider 68 which may be press fitted into the dryer head 10 as shown in Fig. 1. A set screw 70 holds pipe 66 in the spider. An annular seat 72 is fitted to the inner side of spider 68 adjacent and concentric to the pipe 66.

As will be noted from the drawing, the syphon pipe extension 34 extends through main 14 and journal 50 to terminate in a bearing 74 which is ground with a spherical seat and engages seat 72 to constitute a fluid tight connection. Engagement of bearing 74 and seat 72 is insured by spring 76 and collar 78 which constantly bias extension 34 to the right as shown in Fig. 1.

An insulating jacket 80, comprising a cylindrical tube, is interposed between spider 68 and flange 52 to prevent the steam entering from main 14 from directly contacting journal 50. A vent passageway 82 is formed in flange 52 to permit air circulation between jacket 80 and journal 50.

It will, therefore, be apparent that steam introduced at threaded inlet 18 will flow into main 14, through jacket 80 and spider 68 into the interior of dryer head 10 producing the desired temperature of head 10. The condensed steam will be picked up by the syphon pipe 66, conducted through syphon pipe extension 34 and carried away by a conduit connected to outlet flange 28.

Prior constructions of rotary joints use a single conduit to extend through both the joint and spider necessitating perfect concentricity to insure even wear on the sealing rings. Thus, expensive assembling processes must be employed to obtain maximum sealing ring efficiency. The design of the invention eliminates painstaking assembly methods as the bearings 74 and seat 72 will be a self-centering and misalignment of the spider 68 with respect to the axis of journal 50 will not transmit eccentric forces to sealing seats 30 and 42 through the extension 34 to the extent that would be transmitted if extension 34 were rigidly attached to spider 68 or syphon pipe 66.

Steam jacket 80 will prevent the steam passing through main 14 from directly contacting journal 50 and the vented void between jacket 80 and journal 50, being a dead air space, will provide excellent insulating qualities, helping maintain journal 50 at lower temperatures than that of the steam.

A modification of the invention is disclosed in Fig. 2 wherein elements equivalent to those of the embodiment of Fig. 1 are given like primed numerals. The primary feature of the modification is the fact that the seat 72' is formed as part of an insert 84 which may be fitted into the bore of spider 68' concentric with the syphon pipe 66' which may be threaded into spider 68' or held by a set screw as shown in Fig. 1. The construction of this embodiment of the invention permits the self-aligning bearing 74', seat 72', and extension 34 to be easily installed in existing steam joints without machining or modifying the old joint. As will be noted, the spider 68' is bolted to dryer head 10', rather than fitted, as shown in Fig. 1 by way of illustrating various means of affixing spiders to dryer heads. The jacket 80 is not disclosed in Fig. 2 but may be added to the flange 52' and spider 68' with slight modifications to the disclosed structure.

It will, therefore, be apparent that the invention discloses a rotary joint which eliminates several of the defects common to rotary steam joints yet may be economically produced. Superior performance with a minimum of servicing, is guaranteed by the use of sealing rings 46 and 48 which may be easily removed and replaced when necessary, in combination with the self-centering syphon pipe extension 34 which minimizes unequal rotating action caused by misalignment of the spider 68 relative to journal 50 and flange 52 and the use of insulating jacket 80. Spring 76 and collar 78 will maintain a tight seal at seat 72 keeping the condensate and line steam separate.

The self aligning extension may be easily adapted to existing dryer heads as shown in Fig. 2 thus increasing the life of sealing rings already in service. The quick disconnect flange and collar permits rapid maintenance yet secures the joint firmly to the dryer head.

It will be understood that various embodiments other than those disclosed may be apparent to those skilled in the art and it is the intent that other constructions may be made within the spirit and scope of the invention.

I claim:

1. A rotary steam joint for use with a hollow journaled rotating member, comprising in combination, a first annular flange concentrically affixed on said journal, a cylindrical recess formed in said flange concentric with said journal, a tubular main conduit fitted within and extending from said recess, a second flange encircling said main conduit, removable fastening means mounted in said first flange cooperating with said second flange adapted to draw said second flange toward said first flange, an annular recess defined in said conduit, a split collar having a conical peripheral surface fitted within said recess, a conical opening defined within said second flange cooperable with said collar whereby drawing said second flange toward said first flange radially contracts said collar into said annular recess and maintains said conduit within said concentric recess, an enclosed housing having inner and outer covers rotatably mounted on the free end of said conduit, annular seals within said housing sealingly engaging said covers, a pair of primary sealing seats within said housing whereby a primary seat engages each seal, one of said seats being affixed to said conduit and the other seat being slidably supported on said conduit, means biasing said slidable seat away from the affixed seat to maintain sealing engagement of said seats, seals and covers, an inlet chamber in said housing communicating with said conduit, a supporting member having a bore approximately concentric to said journal fixed to the interior of said rotating member, a syphon pipe connected to one end of said bore, an annular seat fixed to said supporting member concentric to and in communication with the other end of said bore, an outlet chamber defined in said housing, a self centering syphon pipe extension within said conduit interposed between said annular seat and said outlet chamber in communication therewith, an annular spherical faced bushing mounted on one end of said extension sealingly engaging said annular seat, the other end of said extension extending through an opening defined in said slidably mounted primary seat and axially slidable supported therein, sealing means interposed between said slidable primary seat and said extension, a collar affixed to said extension and spring means within said conduit engaging said last mentioned collar to bias said extension toward said supporting member.

2. In a rotary steam joint as in claim 1 wherein a tubular insulating jacket encompasses said extension within said journal in spaced relation thereto whereby steam introduced into said inlet chamber will flow into said rotating member between said jacket and said extension.

References Cited in the file of this patent

UNITED STATES PATENTS

| | | |
|---|---|---|
| 459,907 | Hogan | Sept. 22, 1891 |
| 985,155 | Fournia | Feb. 28, 1911 |
| 1,310,391 | Dodge | July 15, 1919 |
| 1,367,347 | Barnes | Feb. 1, 1921 |
| 1,528,967 | Bersted | Mar. 10, 1925 |
| 2,502,365 | Bard | Mar. 28, 1950 |
| 2,693,373 | Tremolada | Nov. 2, 1954 |
| 2,700,558 | Hieronymus | Jan. 25, 1955 |
| 2,805,087 | Shaw | Sept. 3, 1957 |